United States Patent
Donaldson

Patent Number: 6,102,014
Date of Patent: Aug. 15, 2000

[54] EXHAUST GAS RECIRCULATION SYSTEM

[75] Inventor: George E. Donaldson, Chillicothe, Ill.

[73] Assignee: Caterpillar Inc., Peoria, Ill.

[21] Appl. No.: 09/163,027

[22] Filed: Sep. 29, 1998

[51] Int. Cl.[7] ................................................ F02M 25/07
[52] U.S. Cl. ................................ 123/568.12; 123/568.13
[58] Field of Search .......................... 123/568.11, 568.12, 123/568.13, 568.14, 568.15, 568.21

[56] References Cited

U.S. PATENT DOCUMENTS

| | | | |
|---|---|---|---|
| 4,156,414 | 5/1979 | Kawamura et al. | 123/568.12 |
| 4,271,810 | 6/1981 | Lancaster | 123/568.13 |
| 4,328,781 | 5/1982 | Morita | 123/568.12 |
| 5,203,310 | 4/1993 | Gatellier | 123/568.13 |
| 5,203,830 | 4/1993 | Faletti et al. | 123/568.14 |
| 5,351,668 | 10/1994 | Gatellier | 123/568.13 |
| 5,782,226 | 7/1998 | Gartner | 123/568.13 |
| 5,931,131 | 8/1999 | Hackett | 123/568.12 |
| 5,937,834 | 8/1999 | Oto | 123/568.15 |

*Primary Examiner*—Willis R. Wolfe
*Attorney, Agent, or Firm*—Larry G. Cain

[57] ABSTRACT

Past exhaust emission control systems have required additional add on or hang on components. The present exhaust emission recirculation system reduces the emissions emitted from an engine. The present exhaust emission recirculation system is comprised of a head being attached to a block having of a cylinder therein. The head has an intake passage therein and an intake valve interposed the intake passage and the cylinder. The head has a recirculation passage therein having an exhaust gas recirculation valve interposed the intake passage and the cylinder. And, the exhaust gas recirculation valve is movable between a closed position and an open position in which an exhaust gas is communicated from the cylinder to the intake passage.

24 Claims, 3 Drawing Sheets

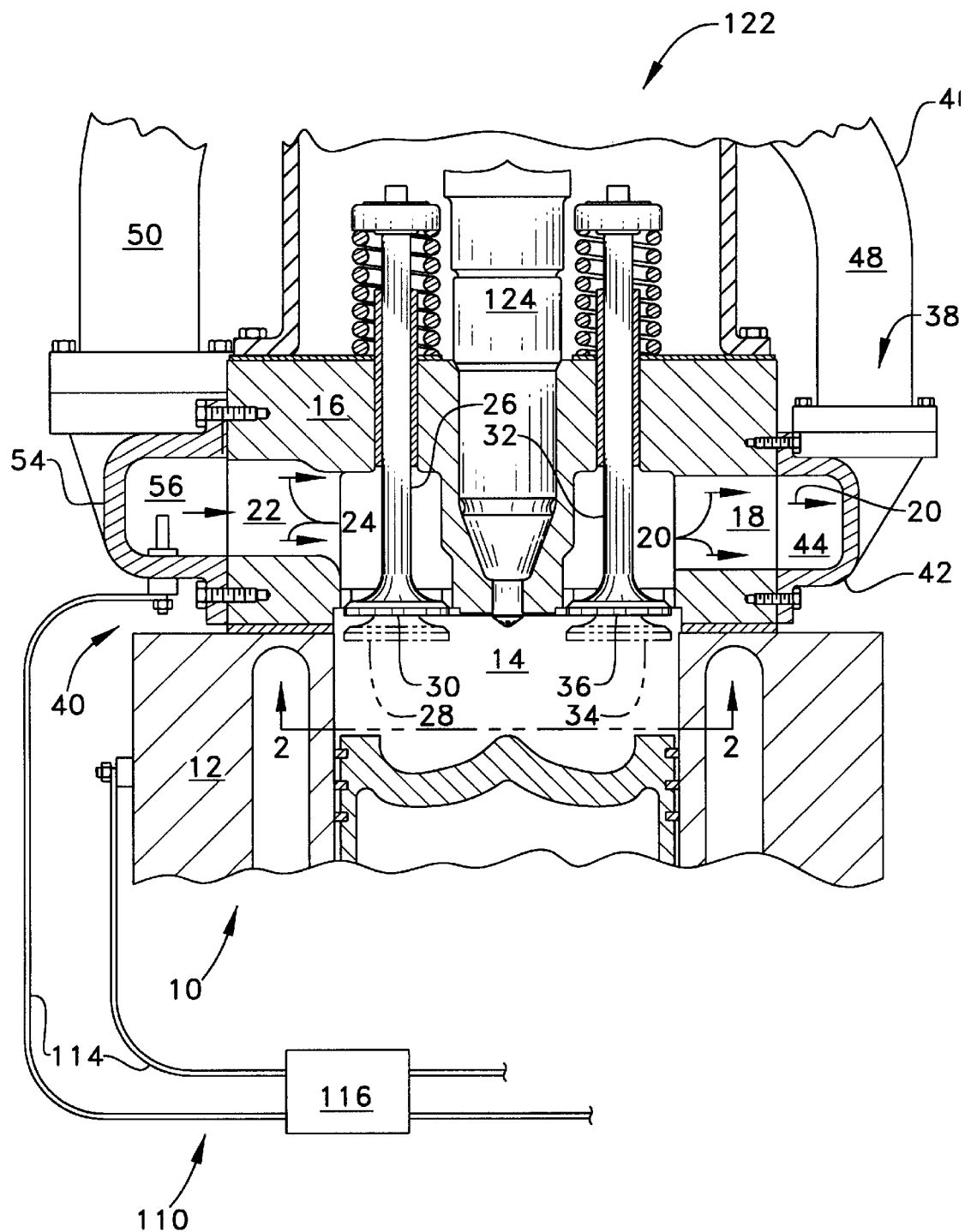
Fig_1_

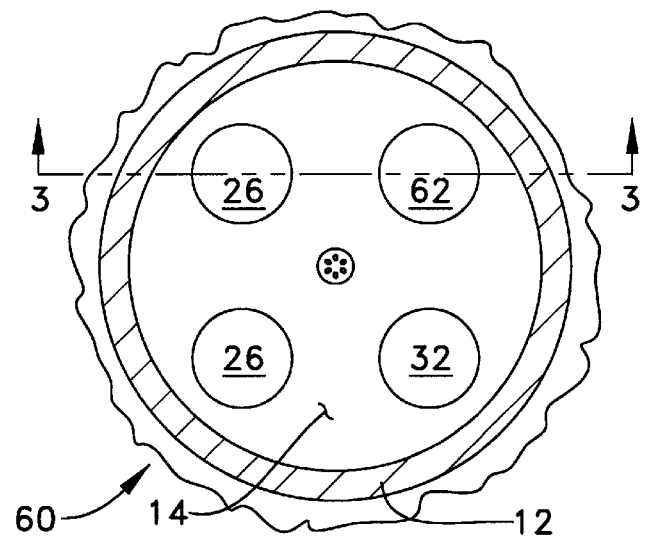
Fig_2_
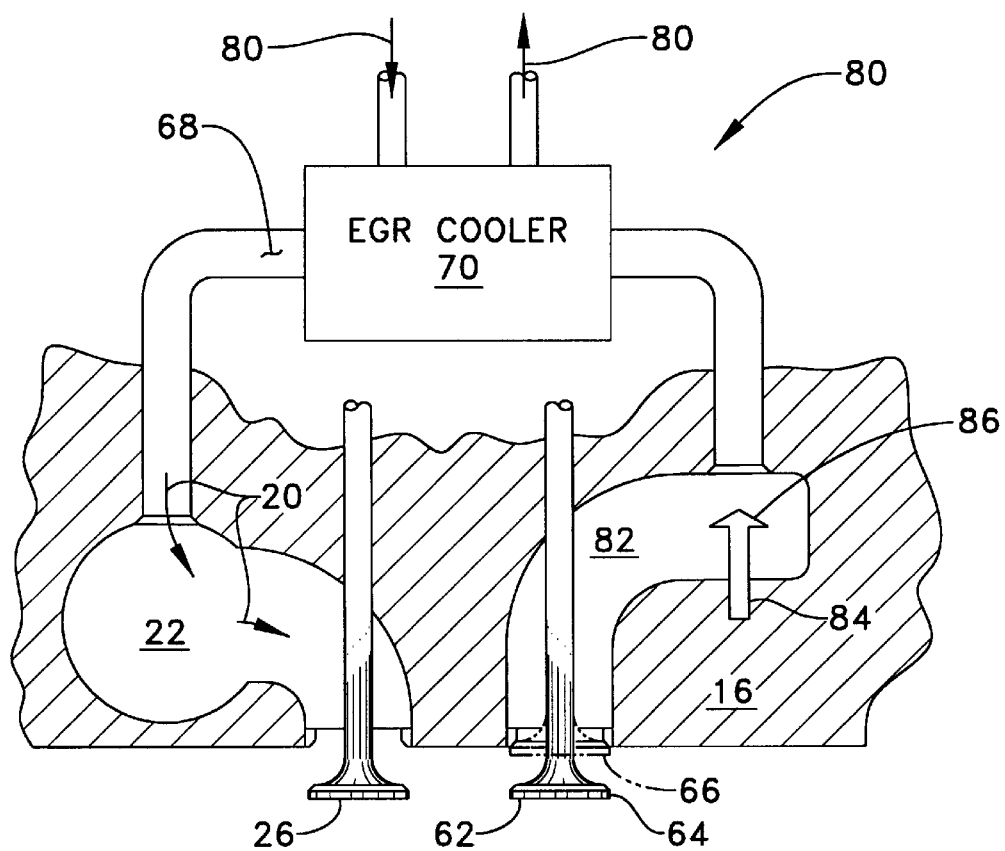
Fig_3_

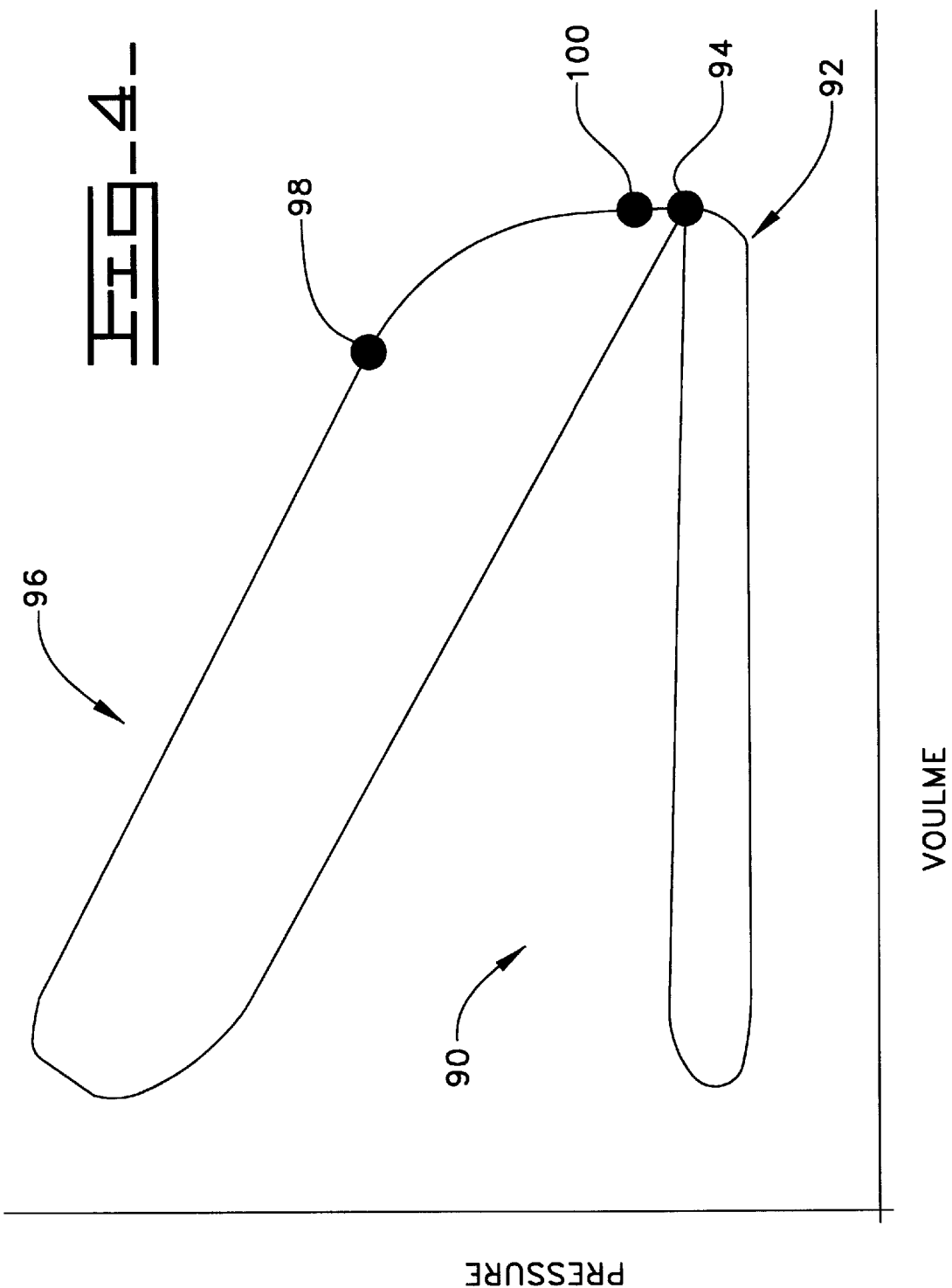

6,102,014

EXHAUST GAS RECIRCULATION SYSTEM

TECHNICAL FIELD

This invention relates generally to an engine and more particularly to a reduction of exhaust emissions.

BACKGROUND ART

The use of fossil fuel as the combustible fuel in engines results in the combustion products of carbon monoxide, carbon dioxide, water vapor, smoke and particulate, unburned hydrocarbons, nitrogen oxides and sulfur oxides. Of these above products carbon dioxide and water vapor are considered normal and unobjectionable. In most applications, governmental imposed regulations are restricting the amount of pollutants being emitted in the exhaust gases.

In the past, NOx emissions have been reduced by reducing the intake manifold temperature, retarding the injection timing, and modifying the injection rate shape. And, the adverse effects on fuel consumption, particulate emissions, and engine performance have largely been alleviated through improvements in the basic engine design and fuel selection. For example, at the present time smoke has normally been controlled by design modifications in the combustion chamber, particulates are normally controlled by traps and filters, and sulfur oxides are normally controlled by the selection of fuels being low in total sulfur. This leaves carbon monoxide, unburned hydrocarbons and nitrogen oxides as the emission constituents of primary concern in the exhaust gas being emitted from the engine.

Many systems have been developed for recycling a portion of the exhaust gas through the engine thereby reducing the emission of these constituents into the atmosphere. The recirculation of a portion of exhaust gas is used to reduce pollution emitted to the atmosphere. In a naturally aspirated engine this process is relative simple. But, with a turbocharged engine, the recirculation of a portion of the exhaust gas into the intake air becomes more complex because the intake pressure is higher than the exhaust pressure during many operating conditions. In many of such past system a volume of the exhaust gas from the engine was redirected to the intake air of the engine through the turbocharger and/or an aftercooler and to the engine. Such systems caused the premature plugging of aftercooler cores and malfunctioning of the systems. Additionally, with such recirculation system deterioration of the exhaust flow was caused by deposit buildup.

Various approaches have been used to address the adverse pressure gradient issue. For example, throttling valves have been installed in the air inlet, back pressure valves in the exhaust gas, intake manifold venturis, etc. to provide sufficient pressure drop to get the exhaust gas to flow to the intake air. Although this provides the necessary pressure drop to functionally operate an exhaust gas recirculation system several disadvantages, such as, fuel consumption, emissions, and/or performance occur.

The present invention is directed to overcoming one or more of the problems as set forth above.

DISCLOSURE OF THE INVENTION

In one aspect of the invention an exhaust gas recirculation system is adapted for use with an engine. The exhaust gas recirculation system is comprised of at least a cylinder being positioned within the engine. A flow of intake air enters the cylinder. A supply of combustible fuel enters the cylinder. A combustion process within the cylinder defines a flow of exhaust gas exiting therefrom. And, an exhaust gas recirculation valve is interposed the flow of intake air and the flow of exhaust gas. The exhaust gas recirculation valve is positioned in contacting relationship with the combustion process and being movable between an open position and a closed position.

In another aspect of the invention a method of reducing exhaust emissions from an engine is disclosed. A conventional combustion cycle is comprised of an intake cycle and an exhaust cycle. The engine has a block defining at least a cylinder. A head is connected to the block. The head defines an intake passage therein and has an intake valve operatively movable between a closed position and an open position, an exhaust passage therein has an exhaust valve operatively movable between a closed position and an open position and a recirculation passage has an exhaust gas recirculation valve operatively movable between a closed position and an open position. The method is comprised of the steps of actuating the exhaust gas recirculation valve into the open position. Flowing an exhaust gas from the cylinder to the recirculation passage. Flowing the exhaust gas into the intake passage. Actuating the intake valve into the open position. And, flowing the exhaust gas into the cylinder.

In another aspect of the invention an engine is comprised of a block defining at least a cylinder. A head is connected to the block. The head defines an intake passage, an exhaust passage, and a recirculation passage therein. An intake valve is positioned in the head and is operatively movable between a closed position and an open position wherein communication occurs between the intake passage and the cylinder. An exhaust valve is positioned in the head and is operatively movable between a closed position and an open position wherein communication occurs between the cylinder and an atmosphere. And, an exhaust gas recirculation valve is positioned in the head and is operatively movable between a closed position and an open position wherein communication occurs between the recirculation passage and the intake passage.

BRIEF DESCRIPTION OF THE DRAWINGS

FIG. 1 is a partially sectioned view of an engine embodying an exhaust gas recirculation system;

FIG. 2 is view taken along line 2—2 of FIG. 1;

FIG. 3 is a view taken along line 3—3 of FIG. 2; and

FIG. 4 is a graphic view of the exhaust gas recirculation system as applied to a conventional cycle of an individual cylinder.

BEST MODE FOR CARRYING OUT THE INVENTION

Referring to FIGS. 1, 2 and 3, an engine 10 includes a block 12 having a plurality of cylinder 14 therein, of which only one is shown, and a head 16 attached to the block 12. The head 16 includes an exhaust passage 18, having a flow of exhaust gas designated by the arrows 20 therein, and an intake passage 22, having a flow of intake air designated by the arrows 24 therein. An intake valve 26, or in this application a pair of intake valve, are interposed the intake passage 22 and the respective one of the plurality of cylinders 14 and operatively moves between an open position 28, shown in phantom in FIG. 1, and a closed position 30. For example, the intake valve 26 can be moved or actuated by a variety of methods, such as, a camshaft and follower, hydraulically, electrically, electro-hydraulically, etc. without changing the essence of the invention. The movement of the intake valve 26 between the closed position 30 and the open position 28 can be of either a single preestablished stroke or length or can be infinitely variable between the closed position 30 and the open position 28. An exhaust valve 32 or in an alternative application, not shown, a plurality of exhaust valves, are interposed the exhaust passage 18 and the respective one of the plurality of cylinders 14 and operatively moves between an open position 34, shown in phantom in FIG. 1, and a closed position 36. For example, the exhaust valve 32 can be moved or actuated by a variety of methods, such as, a camshaft and follower, hydraulically, electrically, electro-hydraulically, etc. The movement of the exhaust valve 32 between the closed position 36 and the open position 34 can be of either a single preestablished stroke or length or can be infinitely variable between the closed position 36 and the open position 34.

An exhaust system 38 and an intake system 40 are removably attached to the engine 10 respectively. The exhaust system 38, in this application, includes an exhaust manifold 42 defining an exhaust passage 44 therein being in communication with the exhaust passage 18 within the head 16. A turbocharger 46, not shown in its entirety, is attached to the exhaust manifold 42 in a conventional manner and has a turbine section 48 operative connected to and being driven by the flow of exhaust gas 20 from a combustion process within the plurality of cylinders 14. The turbocharger 46 further includes a compressor section 50 being driven by the turbine section 48 in a conventional manner. The flow of exhaust gas 20 exits an exhaust opening, not shown, in the turbine section 48 and passes to the atmosphere.

The intake system 40 includes an intake manifold 54 defining an intake passage 56 therein being in communication with the intake passage 22 within the head 16. The compressor section 50 of the turbocharger 46 is operatively connected to the intake passage 56 in a conventional manner. The flow of intake air 24 is communicated from the atmosphere through a filter, not shown, to the compressor section 50 of the turbocharger 46 in a convention manner. The intake air 24 is communicated from the compressor section 50 through an aftercooler, not shown in this application, and to the intake passage 56 within the intake manifold 54 in a conventional manner. And, is communicated into the intake passage 22 within the head 16 and to the plurality of cylinders 14.

An exhaust gas recirculation system 60 is best shown in FIGS. 2 and 3 operatively communicates between the flow of exhaust gas 20 and the flow of intake air 24. For example, in this application, an exhaust gas recirculation valve 62 is interposed the exhaust passage 18 and the intake passage 22 of a respective one of the plurality of cylinders 14. More specifically, in this application, the exhaust gas recirculation valve 62 is positioned in the head 16 and is in contacting relationship with the combustion process within the cylinder 14. The exhaust gas recirculation valve 62 is positioned within the head 16 in a conventional manner as is the conventional intake valves 26 and exhaust valve 32. The exhaust gas recirculation valve 62 operatively moves between an open position 64 and a closed position 66, shown in phantom in FIG. 3. For example, the exhaust gas recirculation valve 62 can be moved or actuated by a variety of methods, such as, a camshaft and follower, hydraulically, electrically, electro-hydraulically, etc. without changing the essence of the invention. The movement of the exhaust recirculation valve 62 between the closed position 66 and the open position 64 can be of either a single preestablished stroke or length or can be infinitely variable between the closed position 64 and the open position 66. In this application, a recirculation passage 68 is formed in the head 16 and intersects with each respective one of the exhaust passage 18 and the intake passage 22 of individual cylinders 14. As an alternative, the recirculation passage 68 could be formed externally of the head 16. And, as a further alternative, the recirculation passage 68 could be operatively connected between a respective cylinder 14 and the intake passage 56 in the intake manifold 54 or between a preestablished number of cylinders 14 and the intake passage 56 and intake passage 22 without changing the essence of the invention. As a further alternative, a cooler 70 could be located in the recirculation passage 68. A coolant, indicated by the arrows 80, is circulated through the cooler 70 in a conventional manner. Additionally, any arrangement, combination and number of intake valves 26, exhaust valves 32 and exhaust gas recirculation valves 62 could be used without changing the essence of the invention. As a further alternative a portion of the recirculation passage 68 could be located external of the head 16 without changing the essence of the invention. As a further alternative and best shown in FIGS. 2 and 3, the exhaust gas recirculation valve 62 has been substituted for one of the exhaust valves 32. The equivalent of the exhaust passage 18 is deadened and forms an exhaust gas recirculation port 82. The exhaust gas recirculation port 82 is in communication with the recirculation passage 68. An exhaust gas recirculation valve 84 is interposed the recirculation passage 68 and the exhaust gas recirculation port 82. The exhaust gas recirculation valve 84 is infinitely movable between an open position 86 and a closed position, not shown, in a conventional manner. As a further alternative the exhaust gas recirculation valve 62 is positioned in each of the plurality of cylinders 14 and exhaust gas recirculation manifold, not shown could be used to collect exhaust gases to be recirculated to the plurality of cylinders 14.

As shown in FIG. 4, a graphic representation of an intake air pressure-volume cycle within the intake passage 22 within the head 16 and the intake passage 56 within the intake manifold 54, indicated by the numeral 90. And, a graphic representation of an exhaust gas pressure-volume cycle within the exhaust passage 18 within the head 16 and the exhaust passage 44 within the exhaust manifold 42, indicated by the numeral 92 is shown. As indicted by the numeral 94, the intake air 24 and the exhaust gas 20 pressure-volume cycle of the cylinder 14 during operation thereof (intake, compression, power and exhaust strokes or cycle) is equal. Furthermore, the pressure-volume cycle within the cylinder 14 is indicated by the numeral 96. At numeral 98 position, the position of the exhaust gas recirculation valve 62 being at the open position 64 is depicted. And, at numeral 100 position, the position of the exhaust gas recirculation valve 62 being at the closed position 66 is depicted. The positions 98 and 100 being the general open position 64 and the general closed position 66 respectively of the exhaust gas recirculation valve 62. Alternate positions can be determined by various operating, performance and structural conditions of the engine 10.

A control system 110 includes a plurality of sensors 112 being positioned about the engine 10. The plurality of sensors 112 monitor engine 10 operating parameters. Such parameters include speed, temperature, pressure and fuel quantity. A plurality of communication means 114 such as wires or electronic devices are interposed the plurality of sensors 112 and a controller 116, such as a computer. The controller 116 can be located onboard the engine 10 or can be remotely positioned from the engine 10.

The engine 10 further includes a convention fuel system 122 supplying a source of fuel, not shown, to each respective one of the plurality of cylinders 14. In this application, a fuel injector 124 of conventional design supplies the fuel to the respective cylinder 14.

Industrial Applicability

In use, the engine 10 is started. Fuel is supplied to each of the plurality of cylinders 14 by the respective fuel injector 124 of the fuel system 122. Intake air 24 is supplied to the engine 10. For example, intake air 24 enters the compressor section 48 and is compressed increasing in pressure. From the compressor section 50, intake air 24 passes through the aftercooler, is cooled becoming more dense and enters into the intake passage 56 in the intake manifold 54. From the intake passage 56, as the intake valve 26 is moved into the open position 28 intake air 24 is drawn through the intake passage 22 into the respective one of the plurality of cylinders 14. The intake air 24 and the fuel are combusted. After combustion, as the exhaust valve 32 is moved into the open position 34 the combusted fuel and intake air 24 form the flow of exhaust gas 20. The flow of exhaust gas 20 enters the exhaust passage 44 of the exhaust manifold 42 through the exhaust passage 18 and passes to the atmosphere.

Under predetermined operating conditions of the engine 10, the exhaust gas recirculation system 60 is actuated. One such predetermined operating condition that would use the exhaust gas recirculation system 60 would be with high load conditions of the engine 10. This condition would provide maximum emissions reduction, especially NOx. For example, the controller 116 receives a signal from at least one of the plurality of sensors 112. The signal is interpreted by the controller 116 and directs a command to the exhaust gas recirculation valve 62. The exhaust gas recirculation valve 62 is moved in a conventional manner from the closed position 66 to the open position 64. Thus, a flow of exhaust gas 20 is allowed to flow from the cylinder 14 through the exhaust passage 18 and the recirculation passage 68 into the flow of intake air 24 in the intake passage 22. Within the intake passage 56 at least partial mixing of intake air 24 and the exhaust gas 20 takes place.

With the present exhaust gas recirculation system 60 and with the control system 110 operational, the controller 116 receives at least a signal from one of the plurality of sensors 112, interprets the signal and operates the exhaust gas recirculation system 60. For example, as interpreted by the controller 116 the exhaust gas recirculation valve 62 is moved between the closed position 66 and the open position 64 depending on the engine 10 operational map or conditions. Thus, as the operating conditions of the engine 10 necessitate the amount of exhaust gas recirculation or flow of exhaust gas 20 is varied and the emissions are controlled within a preestablished parameter.

Other aspects, objects and advantages of this invention can be obtained from a study of the drawings, the disclosure and the appended claims.

What is claimed is:

1. An engine comprising:

a block defining a plurality of cylinders;

a head being connected to said block, said head defining an intake passage an exhaust passage and a recirculation passage therein;

an intake valve being positioned in said head and being operatively movable between a closed position and an open position wherein communication occurs between said intake passage and a respective one of said plurality of cylinders;

an exhaust valve being positioned in said head and being operatively movable between a closed position and an open position wherein communication occurs between a respective one of said cylinders and an atmosphere;

an exhaust gas recirculation valve being positioned in contacting relationship with said combustion process, being positioned in said head and being operatively movable between a closed position and an open position wherein communication occurs simultaneously between said respective one of said cylinders, said recirculation passage and said intake passage of an exhaust gas for recirculation; and only a portion of said plurality of cylinders include an exhaust gas recirculation valve and a recirculation passage being in communication therewith.

2. The exhaust gas recirculation system of claim 1 wherein said exhaust gas recirculation valve being movable between said open position and said closed position through an infinite number of positions.

3. The exhaust gas recirculation system of claim 1 wherein said engine includes a turbocharger.

4. The exhaust gas recirculation system of claim 1 wherein a recirculation passage communicates said flow of exhaust gas to said flow of intake air when said exhaust gas recirculation valve is in the open position.

5. The exhaust gas recirculation system of claim 4 wherein said flow of exhaust gas is passed through a cooler.

6. The exhaust gas recirculation system of claim 1 wherein a control system operatively controls said open position and said closed position of said exhaust gas recirculation valve.

7. The exhaust gas recirculation system of claim 6 wherein said control system includes a controller and a sensor, said sensor being positioned on said engine and monitoring an operating parameter of said engine, said operating parameter being communicated to said controller by a signal.

8. The exhaust gas recirculation system of claim 7 wherein said controller interprets said signal and moves said exhaust gas recirculation valve to a preestablished position between said open position and said closed position.

9. The exhaust gas recirculation system of claim 7 wherein said control system includes a controller and a plurality of sensors, said plurality of sensors being positioned on said engine and each of said plurality of sensors monitoring an individual operating parameter of said engine, said individual operating parameters being communicated to said controller by an individual signal.

10. The exhaust gas recirculation system of claim 9 wherein said controller interprets said signals and moves said exhaust gas recirculation valve to a preestablished position between said open position and said closed position.

11. An engine comprising:

a block defining a plurality of cylinders;

a head being connected to said block, said head defining an intake passage an exhaust passage and a recirculation passage therein;

an intake valve being positioned in said head and being operatively movable between a closed position and an open position wherein communication occurs between said intake passage and said cylinder;

an exhaust valve being positioned in said head and being operatively movable between a closed position and an open position wherein communication occurs between said cylinder and an atmosphere;

an exhaust gas recirculation valve being positioned in said head and being operatively movable between a closed position and an open position wherein communication occurs between said recirculation passage and said intake passage; and only a portion of said plurality of cylinders include an exhaust gas recirculation valve and a recirculation passage being in communication therewith.

12. The exhaust gas recirculation system of claim 11 wherein said engine includes a turbocharger.

13. The engine of claim 11 wherein each of said plurality of cylinders includes an exhaust gas recirculation valve and a recirculation passage being in communication therewith.

14. The engine of claim 11 wherein a portion of said recirculation passage is external of said head.

15. The exhaust gas recirculation system of claim 11 wherein exhaust gas recirculation valve being movable between said open position and said closed position through an infinite number of positions and said infinite number of positions between said open position and said closed position defining a quantity of exhaust gas to be recirculated.

16. The exhaust gas recirculation system of claim 11 wherein said exhaust gas recirculation valve being movable between said open position and said closed position through an infinite number of positions.

17. The exhaust gas recirculation system of claim 16 wherein said infinite number of positions between said open position and said closed position defining a quantity of said flow of exhaust gas from said cylinder.

18. The exhaust gas recirculation system of claim 11 wherein a recirculation passage communicates said flow of exhaust gas to said flow of intake air when said exhaust gas recirculation valve is in the open position.

19. The exhaust gas recirculation system of claim 18 wherein said flow of exhaust gas is passed through a cooler.

20. The exhaust gas recirculation system of claim 11 wherein a control system operatively controls said open position and said closed position of said exhaust gas recirculation valve.

21. The exhaust gas recirculation system of claim 20 wherein said control system includes a controller and a sensor, said sensor being positioned on said engine and monitoring an operating parameter of said engine, said operating parameter being communicated to said controller by a signal.

22. The exhaust gas recirculation system of claim 21 wherein said controller interprets said signal and moves said exhaust gas recirculation valve to a preestablished position between said open position and said closed position.

23. The exhaust gas recirculation system of claim 20 wherein said control system includes a controller and a plurality of sensors, said plurality of sensors being positioned on said engine and each of said plurality of sensors monitoring an individual operating parameter of said engine, said individual operating parameters being communicated to said controller by an individual signal.

24. The exhaust gas recirculation system of claim 23 wherein said controller interprets said signals and moves said exhaust gas recirculation valve to a preestablished position between said open position and said closed position.

* * * * *